L. R. HEIM.

ROLL GRINDING MACHINE.

APPLICATION FILED SEPT. 8, 1920.

Reissued Jan. 25, 1921. 15,035.

4 SHEETS—SHEET 1.

Inventor

Lewis R. Heim

By his Attorneys

Emery, Vaughn, Blair & Hoguet

L. R. HEIM.

ROLL GRINDING MACHINE.

APPLICATION FILED SEPT. 8, 1920.

Reissued Jan. 25, 1921.

15,035.

4 SHEETS—SHEET 2.

Lewis R. Heim Inventor

By his Attorneys

Emery, Varney, Blair & Hoquet

L. R. HEIM.

ROLL GRINDING MACHINE.

APPLICATION FILED SEPT. 8, 1920.

Reissued Jan. 25, 1921.

15,035.

4 SHEETS—SHEET 3.

Lewis R. Heim Inventor

By his Attorneys

Emery, Vaughn, Blair & Hoguet

L. R. HEIM.

ROLL GRINDING MACHINE.

APPLICATION FILED SEPT. 8, 1920.

Reissued Jan. 25, 1921.

15,035.

4 SHEETS—SHEET 4.

Lewis R. Heim Inventor

By his Attorneys

Emery, Varney, Blair & Hogan

UNITED STATES PATENT OFFICE.

LEWIS R. HEIM, OF DANBURY, CONNECTICUT, ASSIGNOR TO THE BALL AND ROLLER BEARING COMPANY, OF DANBURY, CONNECTICUT, A CORPORATION OF CONNECTICUT.

ROLL-GRINDING MACHINE.

15,035. Specification of Reissued Letters Patent. Reissued Jan. 25, 1921.

Original No. 1,210,937, dated January 2, 1917, Serial No. 12,524, filed March 6, 1915. Application for reissue filed September 8, 1920. Serial No. 409,011.

*To all whom it may concern:*

Be it known that I, LEWIS R. HEIM, a citizen of the United States, residing at Danbury, county of Fairfield, State of Connecticut, have invented an Improvement in Roll-Grinding Machines, of which the following is a specification.

This invention has for its object the production of a novel method of grinding rolls and of a machine for carrying my novel method into effect. With these objects in view I have devised the novel method and machine which I will now describe, referring to the accompanying drawings, forming a part of this specification and using reference characters to indicate the several parts.

Figure 1:
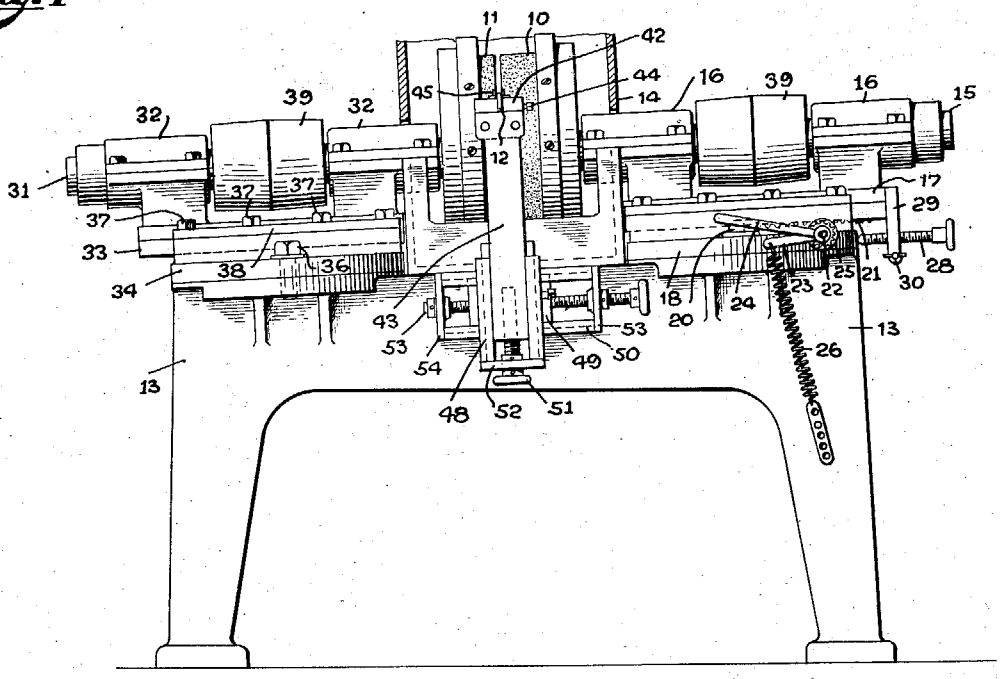
Figure 1 is a front elevation of the machine complete.
Figure 2:
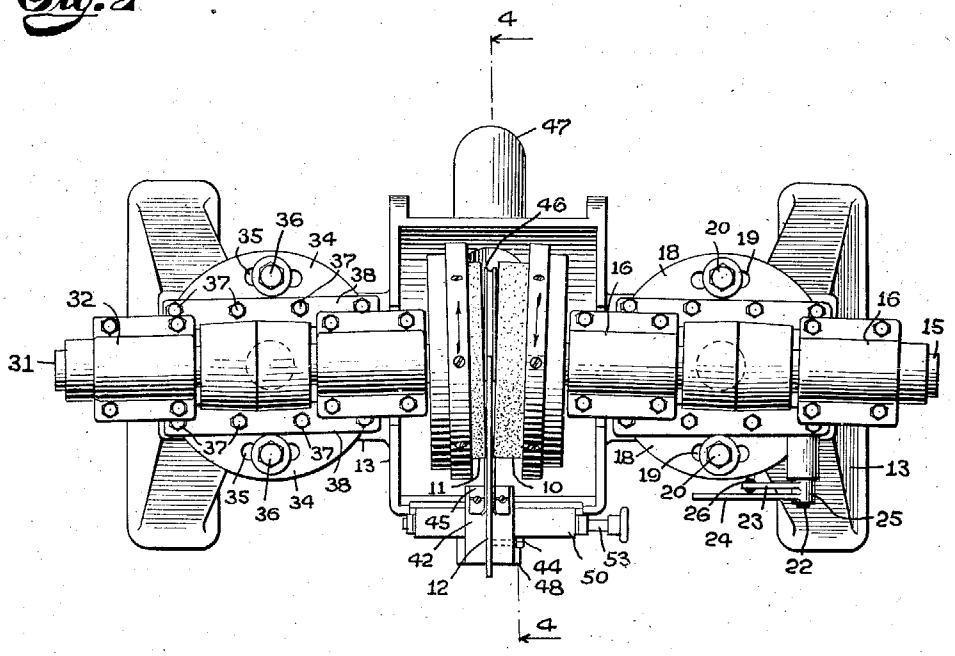
Fig. 2 is a plan view.
Figure 3:
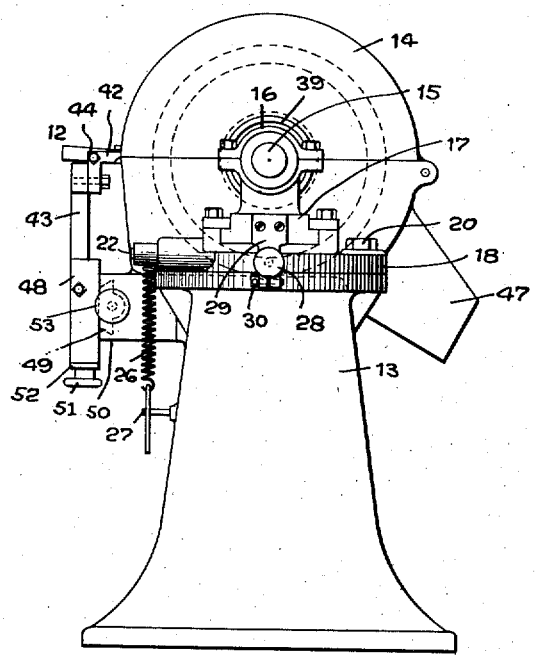
Figure 4:
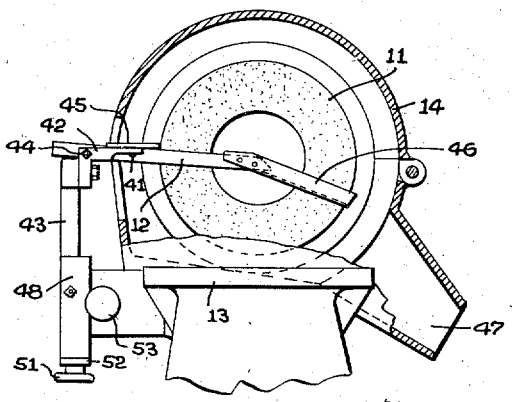
Figure 5:
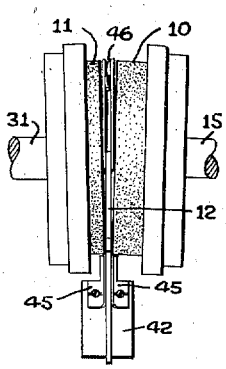
Figure 6:
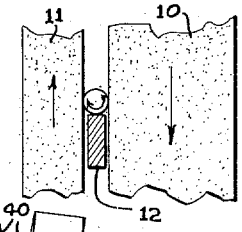
Figure 7:
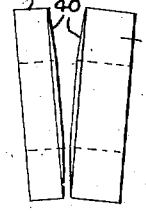

Fig. 3 an end elevation as seen from the right in Figs. 1 and 2;

Fig. 4 a view partly in elevation and partly in section on the line 4—4 in Fig. 2, looking in the direction of the arrows:

Fig. 5 a detail plan view illustrating the operation of grinding rolls;

Fig. 6 a detail elevation on an enlarged scale, as seen from the left in Fig. 4, also illustrating the grinding operation, and Fig. 7 is a diagrammatic view illustrating operative wheels having their contiguous faces formed with a slight bevel.

The essentials are a grinding wheel having a relatively high surface speed, a carrier for the rolls to be operated upon and a wheel moving in the opposite direction and having a relatively low surface speed, the action of which is to cause constant and uniform rotation of the rolls while being operated upon, at a much lower surface speed than the grinding wheel. This wheel I term the regulating wheel for the reason that it regulates the speed at which the rolls rotate while being operated upon.

It may here be noted that by the statement that the wheels move or rotate in opposite directions is meant that they so rotate that their active portions move in opposite directions, and it may also be stated at this point that by a machine of the character described is meant a machine adapted automatically to grind the surfaces of a succession of short rolls.

10 denotes the grinding wheel, 11 the regulating wheel having a suitable holding surface, 12 the carrier, 13 the frame-work of the machine and 14 a hood which incloses the grinding and regulating wheels which for convenience I will term the operative wheels. The grinding wheel is carried by a shaft 15 journaled in boxes 16 on a slide 17 adjustable longitudinally on a circular plate 18 which rests upon the frame-work and has oscillatory adjustment in a plane that is approximately horizontal. Plate 18 is provided with curved slots 19, and bolts 20 passing through these slots and engaging the frame-work, lock the plate, slide, shaft and grinding wheel at any required adjustment in a plane that is approximately horizontal. The slide is adapted to reciprocate in ways upon plate 18 and is provided on its under side with a rack 21. This rack is engaged by a pinion, see dotted lines in Fig. 1, on a transverse shaft 22 journaled in plate 18. An arm 23 and a lever 24 extend from a hub 25 on shaft 22. A spring 26 connected to the arm and detachably connected to a pin 27 extending from the frame-work acts to move the slide, shaft and grinding wheel inward. The tip of an adjusting screw 28 in a bracket 29 depending from the slide bears against the edge of the plate and limits the inward movement of the slide and parts carried thereby. The lever is used to rotate the transverse shaft and move the slide and parts carried thereby outward against the power of the spring, or if preferred the spring may be disconnected from the pin. The spring, however, takes up back lash, renders the pressure of the rolls yielding and improves the action of the regulating wheel. The lower end of the bracket is split and the parts thereof are drawn together to lock the adjusting screw against rotation, after the adjustment of the slide and parts carried thereby has been determined, by a clamping screw 30.

The regulating wheel is carried by a shaft 31 journaled in boxes 32 on a slide 33 adjustable longitudinally on a circular plate 34 which rests upon the frame-work and has oscillatory adjustment in a plane that is approximately horizontal. Plate 34 is provided with curved slots 35 and bolts 36 passing through these slots and engaging the frame-work lock the plate, slide, shaft 31 and the regulating wheel at any required adjustment, in a plane that is approximately horizontal. Up to this point the means for carrying and adjusting the regulating wheel is identical with the means for carrying and adjusting the grinding wheel. The slide is adapted to reciprocate in the ways upon plate 34, but the rack and pinion for reciprocating it is omitted. This adjustment will seldom have to be made so in practice the slide and parts carried thereby may be locked in place in any convenient manner, as by causing bolts 37 to clamp cap plate 38 forming part of plate 34 down tightly upon the base of the slide. The reason that one of the wheels may thus be locked in place or seldom adjusted in the machine shown is that by the use of the solid support with the superimposed mounting for swinging the wheel thereon a compact means is provided for a wide adaptability of the latter wheel and with a suitable adaptability of the carrier substantially all conditions may be conveniently met with the first wheel stationary. In practice plates 18 and 34 are preferably provided with trunnions, indicated by dotted lines in Fig. 2, which engage holes in the frame-work and provide a fixed center of oscillation for the plates. The shafts 15 and 31 are rotated at different speeds, the grinding wheel shaft being rotated at a relatively high speed and the regulating wheel shaft at a relatively low speed, by means of belts, not shown, passing over pulleys 39 shown as lying between the boxes in which the respective shafts are journaled.

It will be noted in Fig. 2 that shafts 15 and 31 are set slightly obliquely to each other so that the contiguous faces of the operative wheels lie closer together upon one side than upon the other and it will be noted in Fig. 1 that the right end of the machine is appreciably higher than the other, so as to place the operative faces of the wheels slightly obliquely to the vertical plane, the regulating wheel being on the relatively low side.

The object in setting the axes of the operative wheels obliquely to each other is to provide space between the wheels for the removal of the rolls after they have been ground. As shown in Fig. 2, both shafts are set slightly obliquely to the central longitudinal line of the machine. This requires that the faces of both the grinding wheel and the regulating wheel be beveled, as at 40, see Fig. 7, so as to provide parallel operative surfaces. The same result would be accomplished, however, by setting one of the shafts, for example, the grinding wheel shaft longitudinally of the machine, and setting the other shaft obliquely. This would require beveling the face of the regulating wheel only. Briefly then, either or both of the shafts may be set obliquely and either or both of the operative wheels must be beveled to correspond with the adjustment of the shafts, which is simply a matter of loosening bolts 20 and 36, and turning plates 18 and 34 to the required position and then tightening up the bolts again. The distance between the operative wheels may be regulated to provide for the grinding of different sized rolls by longitudinal adjustment of slides 17 and 33, more especially slide 17, as already explained.

The object in making one end of what may be termed the bed of the machine higher than the other so as to slightly tilt the operative surfaces of the wheels relatively to the vertical plane, is to utilize gravity to throw the weight of the rolls while being operated upon against the regulating wheel, the grinding wheel being always placed upon the relatively high side and the regulating wheel upon the relatively low side. This feature of construction is of importance in that partly throwing the weight of the rolls against the regulating wheel insures constant and uniform rotation of the rolls thereby and is an aid in securing perfect and uniform grinding of the rolls, scratching of the rolls and the grinding of flats thereon being wholly prevented. The rolls to be operated upon may be fed to the machine in any ordinary or preferred manner. In the present instance I have shown carrier 12 pivoted, as at 41, in a slot in a block or body 42 (shown as substantially in the form of an inverted L) which is bolted or otherwise secured to a standard 43 having both vertical and lateral adjustment. The carrier is locked at the most convenient degree of inclination for feeding the rolls by means of a set screw 44.

45 denotes guides for the rolls which are ordinarily made of sheet metal and are secured to the body on opposite sides of the carrier. After passing the operative faces of the wheels, the finished rolls drop into a trough 46, secured to the inner end of the carrier, by which they are conducted outward between the faces of the wheels on the opposite side of the center (which on that side lie at a greater distance apart). The guide-way or trough which leads the rolls right up to the operating surfaces and the trough which receives them just as they pass from the grip of these surfaces are of peculiar advantage in machines of the nature of those here dealt with in preserving nice alinement of the rolls and aiding in rapid and efficient grinding and feeding action. The rolls drop from the trough into a chute 47 which delivers them into a suitable receptacle.

The standard is vertically adjustable in ways 48 carried by a slide 49 which is itself laterally adjustable in ways 50 upon the frame-work. The vertical adjustment of the standard is effected by means of a screw 51 which is held against longitudinal movement in a cross-piece 52 and engages the slide. The lateral adjustment of the standard is effected by means of a screw 53 which passes longitudinally through the slide, has unthreaded engagement with cross pieces 54 and is retained against longitudinal movement. The lateral adjustment of the standard by means of the slide enables the operator to correctly position the carrier with relation to the operative wheels and to provide for different sizes of rolls and for changes in thickness of either the grinding or regulating wheel or both. It is of course necessary that the top of the carrier should be placed slightly above the horizontal line intersecting the axial line of the wheels, and it is obvious that by raising the carrier the amount of grinding action to which each roll will be subjected will be lessened, as the rolls will be drawn forward more rapidly.

In connection with the vertical adjustment of the standard, the tilting adjustment of the carrier comes into use. As the conditions in grinding different rolls will vary it is impossible to arbitrarily determine any fixed height for the standard or inclination of the carrier that will produce the best results under all the varying conditions of use. In other words, by a relative adjustment of the path of rolls on the carrier, and of the path of the operative surfaces of the regulating wheel, the rate of feed is varied as the thrust of the regulating wheel along the carrier is changed. In practice, I have found approximately the adjustment as to height of standard and inclination of the carrier indicated in Fig. 4 to produce perfectly satisfactory results.

The operation is as follows:—As soon as a roll is picked up by the operative wheels the action is to draw the roll forward and pass it through between the operative faces. It will be noted (see Figs. 2 and 6) that the operative face of the grinding wheel is traveling downward and the operative face of the regulating wheel is traveling upward. As the surface speed of the grinding wheel is much greater than that of the regulating wheel, it follows that the rolls being operated upon will be held down upon the carrier, will be rotated, and will also be drawn forward. The tendency of the regulating wheel to move the rolls backward with respect to the downward movement of the grinding wheel, or in other words, away from the carrier, is wholly overcome by the greater surface speed and greater effect upon the rolls of the grinding wheel. The regulating wheel however has this very important function, in that it insures constant and uniform rotation of the rolls.

Having described my invention, I claim:

1. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, means adapted to adjust relatively the paths of rolls on said carrier and of the operative surface of said regulating wheel and thereby adjust the rate of feed of rolls along said carrier with a given rate of drive of the machine, means adapted to guide the rolls up to the operating surfaces of the wheels, and means adapted to receive the rolls as they pass out of the grip of said surfaces.

2. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, means permitting relative angular adjustment in an upright plane of said carrier and the path of travel of the active portion of said regulating wheel whereby the rate of feed of rolls along said carrier is varied with a given rate of drive of the machine, means adapted to guide the rolls up to the operating surfaces of the wheels, and means adapted to receive the rolls as they pass out of the grip of said surfaces.

3. A machine of the character described comprising a carrier for rolls, a grinding wheel having an operative surface adapted to rotate in the direction of the carrier at a relatively high speed and a regulating wheel coöperating therewith and having an operative surface adapted to rotate in the opposite direction at a relatively low speed, said wheels and said carrier being shaped and positioned to cause the rolls to press against the surface of said regulating wheel by gravity.

4. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, a supporting device adjustably mounted on the frame of the machine, a supporting device adjustably mounted on said first supporting device, and having mounted thereon one of said wheels with its shaft and bearings, one of said adjustments being adapted to permit said wheel with its shaft and bearings to be adjusted angularly with relation to the frame of the machine and locked in adjusted position and the other adjustment being adapted to permit said wheel to be moved toward and away from the other wheel, manual means adapted to cause said last movement and hold the parts in the position into which they are moved.

5. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls, means adapted to permit said carrier to be adjusted vertically with respect to one of said wheels, and means adapted to adjust said carrier toward and away from the operative surface of one of said wheels and hold it in adjusted position.

6. A machine of the character described comprising a grinding wheel adapted to be rotated at a relatively high speed, a regulating wheel adapted to be rotated in the opposite direction at a relatively low speed, a carrier for rolls between said wheels, guiding means adapted to engage the sides of a succession of rolls on said carrier and to guide them endwise into a position on said carrier between said wheels and guiding means adapted to receive said rolls as they pass out of the grip of said wheels, the acting parts of said wheels being substantially parallel.

7. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, means adapted to feed rolls endwise into a position on said carrier between said wheels, a receiving trough adapted to receive the rolls upon passing from between the operative surfaces of said wheels and guide them away from the wheels, means adapted to adjust one of said wheels toward and away from the other wheel, and means adapted to adjust said carrier toward and away from said last wheel and hold it in adjusted position, the active surfaces of said wheels being substantially parallel.

8. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, means whereby the distance between said wheels may be varied, means whereby said carrier may be moved toward and from the operative surface of one of said wheels and held in its adjusted position, means adapted to guide a succession of rolls into a position upon said carrier between said wheels, guiding means adapted to receive said rolls as they pass from the grip of said wheels, the acting parts of said wheels being substantially parallel, and means adapted to adjust relatively the paths of rolls on said carrier and of the operative surface of said regulating wheel and thereby adjust the rate of feed of rolls along said carrier with a given rate of drive of the machine.

9. A machine of the character described comprising a grinding wheel adapted to be rotated at a relatively high speed, a regulating wheel adapted to be rotated in the opposite direction at a relatively low speed, a carrier for rolls between said wheels, means mounting one of said wheels to permit its adjustment toward and away from the other wheel, means adapted to permit adjustment of the distance between the carrier and said last wheel and hold the parts as adjusted, and means to permit adjustment of the paths of the rolls on said carrier and of the operative portion of said regulating wheel whereby the rate of feed of rolls along said carrier is varied with a given rate of drive of the machine.

10. A machine of the character described comprising a grinding wheel adapted to be rotated at a relatively high speed, a regulating wheel adapted to be rotated in the opposite direction at a relatively low speed, a carrier for rolls between said wheels, means adapted to permit adjustment of said carrier toward and from the surface of one of said wheels and hold it in adjusted position, and means adapted to permit relative adjustment of the paths of the rolls along said carrier and of the operative surface of said regulating wheel whereby the rate of feed of rolls along said carrier is varied with a given rate of drive of the machine, the acting parts of said wheels being substantially parallel.

11. A machine of the character described comprising a grinding wheel adapted to be rotated at a relatively high speed, a regulating wheel adapted to be rotated in the opposite direction at a relatively low speed, a carrier for rolls between said wheels, means adapted to permit relative vertical adjustment of said carrier and one of said wheels, means adapted to guide the rolls endwise into position on said carrier between said wheels, and means adapted to permit relative angular adjustment between said carrier and the path of the operative surface of said regulating wheel whereby the rate of feed of rolls along said carrier is varied with a given rate of drive of the machine, the acting parts of said wheels being substantially parallel.

12. A machine of the character described, comprising a grinding wheel adapted to be rotated at a relatively high speed, a regulating wheel adapted to be rotated in the opposite direction at a relatively low speed, a carrier for rolls between said wheels, means adapted to permit adjustment of said carrier toward and from the surface of one of said wheels, means adapted to permit adjustment of one of said wheels toward and from the other whereby the distance between their operative surfaces is varied, means adapted to vary the angular relation of said carrier and of the path of the operative surface of said regulating wheel and thereby vary the rate of feed of rolls upon said carrier, means adapted to guide a succession of rolls into a position on said carrier between said means, and means adapted to receive said rolls as they pass out of the grip of said wheels and guide them away from the wheels, the acting parts of said wheels being substantially parallel.

13. A machine of the character described comprising a grinding wheel adapted to be rotated at a relatively high speed, a regulating wheel adapted to be rotated in the opposite direction at a relatively low speed, a carrier for rolls between said wheels, means adapted to guide a plurality of rolls endwise into a position on said carrier between said wheels, a trough adapted to receive the rolls as they pass outwardly from between the operative portions of said wheels, and means to relatively adjust the paths of rolls along said carrier and of the operative surface of said regulating wheel to vary the angle between said paths and thereby vary the rate of feed of rolls upon said carrier, the acting parts of said wheels being substantially parallel.

14. A machine of the character described comprising a grinding wheel adapted to be rotated at a relatively high speed, a regulating wheel adapted to be rotated in the opposite direction at a relatively low speed, a carrier for rolls between said wheels, means adapted to permit relative vertical adjustment between said carrier, and one of said wheels, means adapted to permit adjustment of said carrier toward and from the surface of one of said wheels and hold it in adjusted position, and means adapted to permit adjustment of one of said wheels relatively to the other whereby the distance between their operative surfaces is varied.

15. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action, means adapted to permit relative vertical adjustment between said carrier and one of said wheels, means adapted to vary the distance between said carrier and the surface of one of said wheels and hold the parts in adjusted position, guiding means adapted to guide rolls endwise into a position on said carrier between said wheels and guiding means adapted to receive said rolls as they pass from between the operative portions of said wheels.

16. A machine of the character described comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action, means adapted to permit relative vertical adjustment between said carrier and one of said wheels, means adapted to permit variation of the distance between said carrier and the surface of one of said wheels and hold the parts in adjusted position, guiding means adapted to guide rolls endwise into a position on said carrier between said wheels, guiding means adapted to receive said rolls as they pass from between the operative portions of said wheels, and means adapted to permit adjustment of one of said wheels toward and from the other the acting parts of said wheels being substantially parallel.

17. A machine of the character described comprising a grinding wheel adapted to be rotated at a relatively high speed, a regulating wheel adapted to be rotated in the opposite direction at a relatively low speed, a carrier for rolls between said wheels, means adapted to permit relative vertical adjustment between said carrier and one of said wheels, means adapted to permit adjustment of said carrier toward and away from the surface of one of said wheels and hold it in adjusted position, and means adapted to permit relative swinging movement of said carrier and said regulating wheel in an upright plane whereby the feeding action of said regulating wheel upon said carrier is varied with a given rate of drive of the machine.

18. A machine of the character described, comprising a grinding wheel adapted to be rotated at a relatively high speed, a regulating wheel adapted to be rotated in the opposite direction at a relatively low speed, a carrier for rolls between said wheels adapted to support a plurality of rolls for simultaneous action thereon, means adapted to adjust the distance between said carrier and one of said wheels and hold it in adjusted position, a supporting frame, a slide mounted upon the machine to move toward and away from said grinding wheel, means mounted upon said slide and supporting said regulating wheel with its bearings, means adapted to guide rolls into a position on said carrier between said wheels, means adapted to receive rolls as they pass out of the grip of said wheels and means adapted to permit angular adjustment of said regulating wheel with its bearings with respect to the machine, the acting parts of said wheels being substantially parallel.

19. A machine of the character described comprising a grinding wheel adapted to be rotated at a relatively high speed, a regulating wheel adapted to be rotated in the opposite direction at a relatively low speed, a carrier for rolls between said wheels, means adapted to permit adjustment of one of said wheels toward and away from the other wheel, means adapted to permit adjustment of the distance between said carrier and said last wheel and hold it in adjusted position, and means adapted to guide a series of rolls into a position on said carrier between said wheels.

20. A machine of the character described comprising a grinding wheel adapted to be rotated at a relatively high speed, a regulating wheel adapted to be rotated in the opposite direction at a relatively low speed, a carrier for rolls between said wheels, means whereby the distance between said wheels may be varied, means whereby said carrier may be moved toward and from the operative surface of one of said wheels and be held in adjusted position, means adapted to guide a succession of rolls endwise into a position upon said carrier between said wheels, and guiding means adapted to receive said rolls as they pass from between the operative surfaces of said wheels.

21. A machine of the character described comprising a grinding wheel adapted to be rotated at a relatively high speed, a regulating wheel adapted to be rotated in the opposite direction at a relatively low speed, a carrier for rolls between said wheels, means whereby the distance between said wheels may be varied, means whereby said carrier may be moved toward and from the operative surface of one of said wheels and be held in adjusted position, means adapted to guide a succession of rolls endwise into a position upon said carrier between said wheels, guiding means adapted to receive said rolls as they pass from between the operative surfaces of said wheels, and means adapted to vary the angular relation of the paths of travel of rolls upon said carrier and of the operative surface of said regulating wheel, whereby the rate of feed of the rolls along said carrier is varied with a given rate of drive of the machine.

In testimony whereof I have hereunto set my hand this 27th day of August, 1920.

LEWIS R. HEIM.